United States Patent [19]

Fortune

[11] 4,204,299
[45] May 27, 1980

[54] REPLACEABLE TIP FOR DESOLDERING TOOLS

[76] Inventor: William S. Fortune, 14250 Dearborn St., Panorama City, Calif. 91402

[21] Appl. No.: 922,676

[22] Filed: Jul. 7, 1978

[51] Int. Cl.² .......................... A47L 9/02; B23K 3/00
[52] U.S. Cl. .................................. 15/415 R; 15/341; 15/414; 228/20
[58] Field of Search ................ 15/339, 341, 344, 414, 15/415 R; 228/20

[56] References Cited

U.S. PATENT DOCUMENTS

| | | | |
|---|---|---|---|
| 3,263,889 | 8/1966 | Fortune | 228/20 |
| 3,549,078 | 12/1970 | Fortune | 15/341 X |
| 3,912,149 | 10/1975 | Fortune | 228/20 |
| 3,921,249 | 11/1975 | Fortune | 15/341 |
| 3,980,218 | 9/1976 | Fortune | 228/20 |

FOREIGN PATENT DOCUMENTS 2736309 3/1978 Fed. Rep. of Germany ............ 15/341

Primary Examiner—Christopher K. Moore
Attorney, Agent, or Firm—Daniel T. Anderson

[57] ABSTRACT

A replaceable tip assembly for desoldering tools includes an end cap and a nozzle tip in the end cap. The end cap has a frustoconical front portion and a rear cylindrical portion, both being concentric with the central axis thereof. The end cap has a central bore extending therethrough provided with an inwardly extending annular detent. An annular relief is provided between the cylindrical and frustoconical portions so that the inner core is flexible. The nozzle tip has a generally cylindrical outer surface and a central bore extending therethrough. The nozzle tip also has an annular recess cooperating with the annular detent of the end cap. Preferably the annular detent on the end cap and the annular recess on the nozzle tip are disposed about halfway between the two end planes of the end cap.

8 Claims, 9 Drawing Figures

REPLACEABLE TIP FOR DESOLDERING TOOLS

BACKGROUND OF THE INVENTION

1. Field of the Invention

This invention relates generally to desoldering tools and particularly, relates to a replaceable tip assembly for such tools.

2. Description of the Prior Art

Desoldering tools are generally provided with a nozzle tip disposed in an end cap to provide a tip assembly. The tip assembly is then somehow retained by the barrel of a desoldering tool. Among examples of such prior art desoldering tools are the ones disclosed in applicant's prior patents U.S. Pat. No. 3,912,149 entitled "Portable Desoldering Tool" and U.S. Pat. No. 3,921,249 entitled "Miniature Vacuum Stroke Cleaning Implement".

Both of these patents disclose a replaceable tip assembly consisting of a nozzle tip and an end cap. Other end caps and nozzle tips have also been devised.

Unless the material of the nozzle tip of the tip assembly is of high quality, excessive wear of the tip results. Furthermore, unless there is a tight press fit between end cap and nozzle tip, the vacuum developed by the desoldering tool will be at least partially lost and hence, may be insufficient to suck up solder or other materials.

Furthermore, it has been found that it is essential for the proper operation of the tool that the end cap be flexible. If the end cap is relatively stiff, external pressure exerted upon the nozzle tip causes a concentrated stress both at the barrel of the desoldering tool and the end cap. Since desoldering tools are generally manufactured of plastic materials, they are highly susceptible to stress cracking under such circumstances. The normal change of temperatures experienced by such tools further aggravates the stress cracking.

Additionally, if the end cap is flexible, it will avoid damage to sometimes sensitive components to be desoldered, particularly while the piston of the instrument flies back to create the vacuum.

It is accordingly an object of the present invention to provide an improved, replaceable tip assembly which avoids the drawbacks of prior art tip assemblies.

A further object of the present invention is to provide a relatively flexible end cap which is not subject to stress cracking, and which is less likely to damage sensitive components.

Another object of the present invention is to provide a replaceable tip assembly providing a proper press fit between end cap and nozzle tip and a mounting means of the tip assembly with a desoldering instrument which is both substantially vacuum tight and flexible.

SUMMARY OF THE INVENTION

In accordance with the present invention, there is provided a replaceable tip assembly for desoldering tools. The tip assembly includes an end cap and a nozzle tip disposed in the end cap. The end cap has a frustoconical front portion terminated at its small diameter in a planar surface substantially normal to the central axis thereof. The rear portion of the end cap is cylindrical and coaxial with the central axis. The cylindrical rear portion has a diameter intermediate the small and large diameters of the frustoconical portion. The end cap has a central bore having an annular, inwardly extending detent of smaller diameter than that of said central bore. Finally the end cap is provided with an annular relief between its cylindrical and frustoconical portions, the relief being also coaxial with the central axis. As a result, the inner portion of the end cap adjacent the bore is relatively flexible.

The nozzle tip is disposed in the end cap and has a generally cylindrical outer surface continuing in an outer tip portion of reduced diameter or conical shape. The nozzle tip has a central bore extending therethrough and an annular recess cooperating with the annular detent of the end cap to form a tight connection therebetween. The connection provides a press fit and is substantially vacuum tight.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
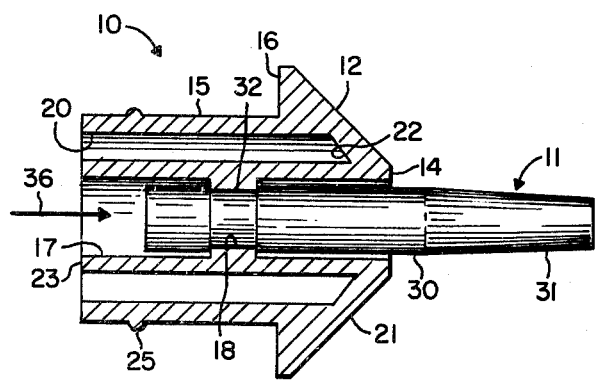
FIG. 1 is a cross sectional view on enlarged scale of an end cap in accordance with the present invention and an elevational view of a nozzle tip disposed therein.

Referring now to the drawings, it is stressed that the particulars shown are by way of example and for purposes of illustrative discussion only, and are presented for providing what is believed to be the most useful and readily understood description of the principles and structural concepts of the invention. Specifically, the detailed showing is not to be taken as a limitation upon the scope of the invention which is defined by the appended claims.

Figure 2:
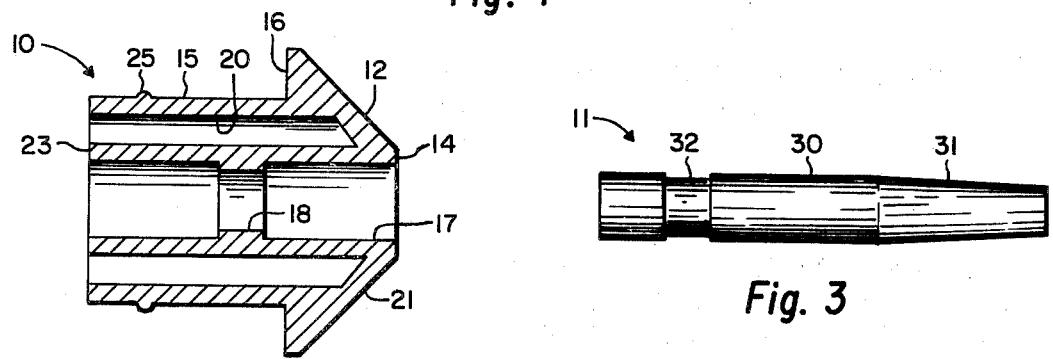
FIG. 2 is a cross sectional view of the end cap of FIG. 1.
Figure 3:
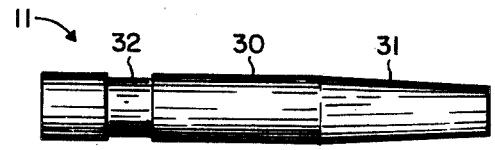
FIG. 3 is a side elevational view of the nozzle tip of FIG. 1.

Referring now to FIGS. 1, 2 and 3, there is illustrated a replaceable tip assembly for desoldering tools, and showing by way of example, an embodiment of the present invention. The tip assembly includes an end cap 10 also shown in FIG. 2, and a nozzle tip 11, illustrated in FIG. 3. The end cap 10 as shown in FIGS. 1 and 2 has a frustoconical front portion 12 which terminates in a planar surface 14 disposed normal to the central axis of the end cap 10 and nozzle tip 11. The end cap 10 is provided with a rearwardly extending, cylindrical portion 15. The cylindrical portion 15 has a diameter intermediate that of the smallest diameter of the frustoconical portion 12 near the planar surface 14, and the largest diameter of the portion 12 near its rearward sholder 16.

A central bore 17 extends throughout the end cap 10. The central bore 17 is of cylindrical shape except for an annular, inwardly extending detent 18 having a rectangular section.

The end cap 10 is also provided with an annular relief 20 which extends through the cylindrical portion 15 into the frustoconical front portion 12. The annular relief 20 terminates near the front wall 21 of the frustoconical portion 12 and preferably forms a conical recess 22. Thus an inner core 23 is created which is relatively flexible due to the fact that it is only connected with the outer portion of the end cap by a relatively thin wall of the frustoconical portion 12.

Preferably the cylindrical portion 15 of the end cap is provided near its rearward end with an annular ring 25 of bead-like section for creating a press fit with the barrel of a desoldering instrument.

The nozzle tip 11 is designed for cooperation with the end cap 10. It consists of a generally cylindrical body 30 which may have a forward section 31 which is slightly tapered or of frustoconical outline. The diameter of the cylindrical body 30 is such that it will fit the cylindrical bore 17 of the end cap 10. Furthermore, the nozzle tip has an annular recess 32 having a diameter to provide a press fit with the detent 18 of the end cap 10. It will be noted that the detent 18 is disposed about midway between the two ends of the end cap 10. Similarly, the annular recess 32 is located near the rear portion of the nozzle tip 11 and rearwardly of the cylindrical body 30. As shown more clearly in FIG. 8, a central bore 34 extends through the nozzle tip 10. The bore 34 of FIG. 8 forms a cylinder. The rearward end of the bore 34 may have a slightly enlarged diameter, as shown at 35. The purpose of the cylindrical bore 34 will be described later on.

The end cap 10, shown in FIG. 2, may be assembled with the nozzle tip 11 of FIG. 3, as shown in FIG. 1. The nozzle tip 11 is forcibly pushed through the central bore 17 of the end cap 10 in the direction shown by arrow 36. The nozzle tip 11 preferably consists of a heat-resistant and somewhat flexible material. By way of example, the nozzle tip 11 may consist of polytetrafluoroethylene resin, better known under its trademark, Teflon. Therefore, the nozzle tip 11 is capable of being slightly deformed by the detent 18 while being pushed into the end cap 10. Finally, the recess 32 in the end cap 11 will mate with the annular detent 18, and the nozzle tip is firmly secured in the end cap. It will form a substantially vacuum tight connection so that the vacuum created by the desoldering instrument will hold while solder or other substances are sucked up.

It should be noted that once the nozzle tip 11 is joined to the end cap 10, the two can no longer be pulled apart or severed in any manner without destroying both the nozzle tip 11 and the end cap 10.

Figure 4:
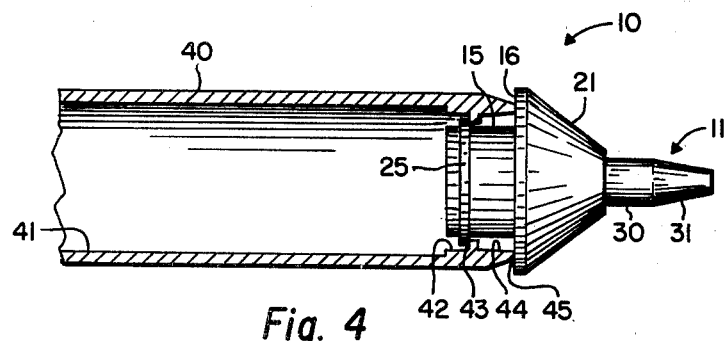
FIG. 4 is a cross sectional view of the barrel of a desoldering tool shown by way of example with the tip assembly of the invention disposed therein.

Referring now to FIG. 4, there is illustrated by way of example, a barrel 40 for accepting the tip assembly 10, 11 of the present invention. The barrel 40 may be the front end of a desoldering tool. It has an internal diameter 41 large enough to accept the tip assembly 10, 11. It may have a reduced diameter opening 42 terminating in an annular, inwardly directed projection 43 of substantially square cross section.

Hence, the tip assembly 10, 11 may be forcibly pushed to the left of FIG. 4 into the barrel 40 until the annular, outward projection of ring 25 on the end cap is located rearwardly of the annular, inward projection 43 of the barrel 40. This connection again is substantially vacuum tight, yet it will permit deflection of the nozzle tip 11 to a certain degree without losing the vacuum. To this end, the forward portion of the barrel 40, that is forwardly of the projection 43, forms an outwardly extending, diverging to the right, cone 44 to permit the cylindrical surface 15 of the end cap 10 to tilt or swivel about the projection 43. The rear surface 16 of the frustoconical end cap portion 12 seats against the forward surface 45 of the barrel 40.

Figure 5:
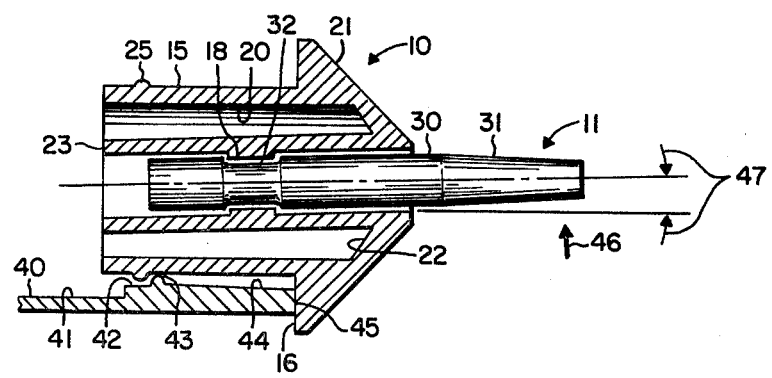
FIG. 5 is a cross sectional view of the end cap similar to that of FIG. 1 with the nozzle tip shown in elevation therein and illustrating a portion of the barrel of a desoldering tool to illustrate the flexing of the tip assembly caused by pressure against the nozzle tip.

The deflection of the tip assembly 10 in the barrel 40 is more clearly shown in FIG. 5, to which reference is now made. Thus, let it be assumed that the forward frustoconical tip 31 of the nozzle tip 11 is pressed upwardly, as shown by the arrow 46. This will cause a deflection, the angle of which is indicated by the arrows 47. It will be seen that the central core 23 of the end cap is rotated in a counter-clockwise direction. Accordingly, as shown in FIG. 5, the space of the annular relief 20 is greater in the top portion in the section shown than in the bottom portion. Similarly, the end cap 10 is permited to swivel about the single connecting plane between the annular ring 25 on the end cap 10, and the inwardly extending annular detent 43 of the barrel 40. It will also be obvious that the inner core 23 is made very flexible due to the fact that the annular relief 20 extends forwardly close to the frustoconical surface 21 as shown at 22.

Figure 6:
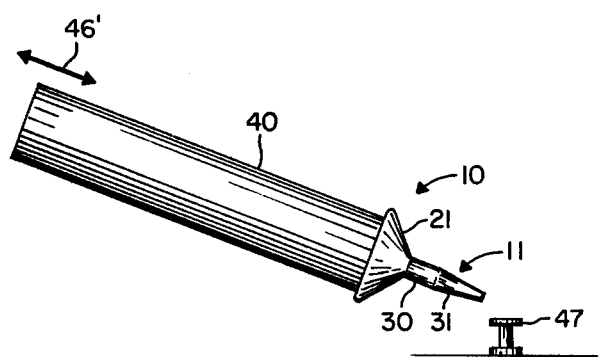
FIG. 6 is a schematic elevational view of a desoldering instrument provided with the tip assembly of the invention and a component to be desoldered and illustrating the recoil of the desoldering tool.

Normally when a desoldering tool is actuated, there is a certain amount of recoil due to the rapid travel of a spring loaded piston toward the rear of the tool. This action has been illustrated in FIG. 6 where the recoil is schematically shown by the double headed arrow 46'. The tip assembly, including the end cap 10 and the nozzle tip 11, are shown attached to the barrel 40. Due to the recoil experienced by any desoldering tool upon actuation, it is feasible that the nozzle tip 10 may strike a component shown schematically at 47. The action of this recoil is minimized by the fact that the nozzle tip has a certain freedom of movement in the end cap, as explained in connection with FIG. 5.

Figure 7:
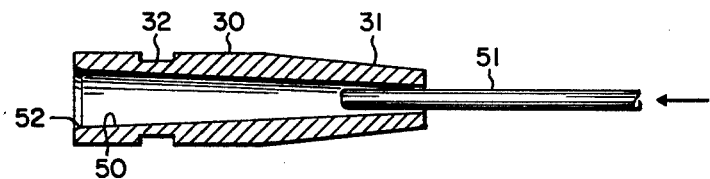
FIG. 7 is a cross sectional view on enlarged scale of a nozzle tip having a conical central bore and a cleaning rod extending partially therethrough from the front thereof.

A particular nozzle tip design is illustrated in FIG. 7 which is particularly designed for cleaning it from its front end. In this case, the nozzle tip is provided with a bore 50 which is tapered from front to rear to form a conical opening, wider at the rear than at the front to provide clearance and preclude jamming of any clogging material. The nozzle tip may be cleaned by a cleaning rod 51 which enters the tip from the front. An enlarged diameter relief 52 may be provided at the rear portion of the nozzle tip.

Figure 8:
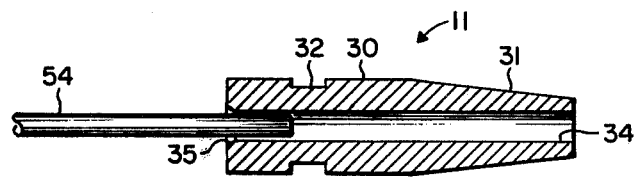
FIG. 8 is a cross sectional view of another nozzle tip being cleaned by a cleaning rod extending from the rear thereof and having a cylindrical bore.

The nozzle tip of FIG. 8, previously referred to, is provided with a cylindrical, or slightly diverging to the right, bore 34. This type of nozzle tip is designed to be cleaned by a cleaning rod 54 from the rear. The cleaning rod 54 may be part of the desoldering tool which is designed to automatically clean the solder tip during each cycle of operation. Such a tool is illustrated, for example, in the applicant's prior U.S. Pat. Nos. 3,912,149 and 3,921,249, above referred to.

Figure 9:
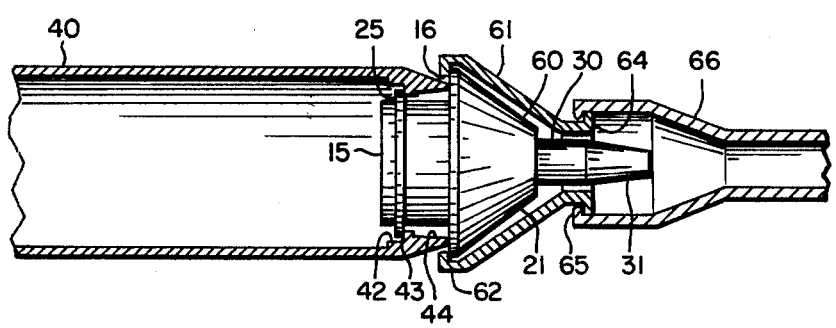
FIG. 9 is a cross sectional view of the barrel of a desoldering tool provided with the tip assembly of the invention and illustrating a section of an adapter cap and tip accessory disposed over the barrel and the tip assembly.

In some cases, it may be desirable to attach a certain tip accessory to the soldering instrument provided with the tip assembly of the invention. In this case it may be necessary to utilize an adapter cap. Such a combination is illustrated in FIG. 9, to which reference is now made. Here an adapter cap 61 is illustrated which extends over the end cap 10 and its frustoconical surface 21, the end cap 10 being secured to the barrel 40 of a desoldering tool as explained in connection with FIG. 5. The adapter cap 61 also has a frustoconical surface 61 and an inner opening to accept the frustoconical surface 21 of the end cap 10. The adapter cap 61 has a rearwardly, extending flange 62 which is turned inwardly so as to grip the rear surface 16 of the frustoconical end cap portion 12 and to provide a substantially vacuum tight seal therein.

The adapter cap 61 has a forward porton of small diameter extending into a lip 64 which extends outwardly to fit over a rearward and inwardly extending detent 65 of the barrel 66 of the tip accessory which may, for example, be a swivel tip or other such specially adapted apparatus.

It will be understood that the flange 62 has a press fit over the frustoconical portion 12 and the rear surface 16 of the end cap. Similarly, it forms a press fit by its lip 64 with the detent 65 of the accessory barrel 66.

There has thus been disclosed a tip assembly for desoldering tools. The tip assembly consists of an end cap and a nozzle tip. The nozzle tip can be pressed into the rear of the end cap, whereupon the nozzle tip will be properly seated and locked into place to form a substantially vacuum tight connection with the end cap. After the nozzle tip is properly seated in the end cap, it can no longer be removed without destroying both end cap and nozzle tip. The end cap has an inner core which is relatively flexible and, hence, permits deflection of the nozzle tip without causing cracking of the plastic materials of the tip assembly. Furthermore, the end cap has a single, annular ring mating with a corresponding, internally projecting detent on the barrel of a desoldering tool. This connection will provide a substantially vacuum tight connection, yet permit a certain amount of deflection. In view of the flexibility of the tip assembly, any damage to a component to be desoldered due to recoil of the desoldering tool is minimized. Nevertheless, the end cap and nozzle tip can be readily removed from the desoldering tip for cleaning or replacement. An adapter cap has been disclosed which can be snapped over the end cap. It features a retaining lip for connection to various tip accessories. The adapter cap forms a tight seal with both the tip assembly and the tip accessory.

What is claimed is:

1. A replaceable tip assembly for attachment to the forward end of the barrel of a desoldering tool, said assembly comprising:
   an end cap adapted to be removably secured to said forward barrel end of a desoldering tool, said end cap having a frustoconical front portion terminated at its small diameter in a front end planar surface substantially normal to the central axis thereof, said end cap having a rear cylindrical portion extending rearwardly from said front frustoconical portion terminating in a rear end planar surface, said end cap having a central bore coaxial with its central axis;
   said end cap being formed to include a rearwardly open, cylindrically annular well extending forwardly coaxially with said axis from said rear end planar surface to a point axially near said front frustoconical portion and being closed at its forward end by said frustoconical portion, said well being radially disposed between the outer surface of said rear cylindrical portion of said end cap and its said central bore, said well thereby defining an outer annular rearwardly extending skirt portion of said end cap and an inner cylindrical annular portion, the two portions of said end cap being interconnected only by a radially intermediate, axially short portion of its said front frustoconical portion; and
   a nozzle tip disposed in said end cap, said nozzle tip having a generally cylindrical outer surface continuing forwardly in an outer tip portion of reduced outer diameter, said nozzle tip having a central bore extending therethrough,
   one of said central bore of said cap and said outer cylindrical surface of said nozzle tip having an annular, radially extending ridge and the other having an annular recess cooperating with said annular ridge to form a tight connection therebetween, at least a part of said cooperating ridge and recess being disposed axially rearwardly of said front frustoconical portion.

2. A tip assembly as defined in claim 1 wherein said annular ridge is provided on said central bore of said end cap and said annular recess is provided on said outer cylindrical surface of said nozzle tip.

3. A tip assembly as defined in claim 1 wherein said end cap is provided on its cylindrical surface with an outer annular ring for said attachment with a desoldering tool.

4. A tip assembly as defined in claim 3 in which said barrel has an internal, cylindrical opening to accommodate said end cap up to its frustoconical end portion, and said barrel having an inwardly extending annular retaining portion for retaining said end cap by said outer ring.

5. A tip assembly as defined in claim 4 wherein said retaining portion on said barrel has a substantially square cross section.

6. A tip assembly as defined in claim 1 wherein said annular relief extends substantially near the front end of said frustoconical portion of said end cap and terminates in a frustoconical recess.

7. A tip assembly as defined in claim 1 wherein said annular detent in said end cap and said annular recess in said nozzle tip are disposed approximately halfway between the two end planes of said end cap.

8. In a desoldering instrument of the type having a replaceable tip assembly, an adapter cap and a substantially cylindrical barrel with a tip assembly retaining recess:
   an end cap having a forward frustoconical portion and a rearward, substantially cylindrical portion having a diameter intermediate the large and small diameters of said frustoconical portion and adapted to fit the barrel of the desoldering instrument, said cylindrical portion having an outer, annular ring for cooperation with a projection in the barrel, said end cap having a substantially cylindrical bore extending therethrough and a radially, inwardly extending annular constriction of said bore;
   a nozzle tip having a central bore therethrough and a substantially cylindrical outer surface, said nozzle tip being provided near its rear end with an annular reduced portion providing a press fit with said annular constriction of said bore in said end cap; and an adapter cap of substantially frustoconical shape and having an inner opening for receiving said frustoconical portion of said end cap and said nozzle tip, said adapter cap having a rearwardly extending, annular bent-over and inwardly extending flange for surrounding the largest diameter end of said frustoconical portion of said end cap, and said adapter cap having a forward, outwardly extending annular lip near the smallest diameter of its frustoconical portion for cooperation with a tip accessory.

* * * * *